US012526161B2

(12) United States Patent
Tadepalli et al.

(10) Patent No.: US 12,526,161 B2
(45) Date of Patent: *Jan. 13, 2026

(54) RESILIENCY ARCHITECTURE FOR IDENTITY PROVISIONING AND VERIFICATION

(71) Applicant: Humana Inc., Louisville, KY (US)

(72) Inventors: Hari Tadepalli, Gilbert, AZ (US); Parthasarathi Chakraborty, Jersey City, NJ (US)

(73) Assignee: Humana Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,760

(22) Filed: Sep. 8, 2023

(65) Prior Publication Data

US 2023/0421391 A1 Dec. 28, 2023

Related U.S. Application Data

(63) Continuation of application No. 17/345,787, filed on Jun. 11, 2021, now Pat. No. 11,792,021.

(51) Int. Cl.
*H04L 9/32* (2006.01)
*H04L 43/10* (2022.01)
*H04L 67/563* (2022.01)
*H04L 67/63* (2022.01)

(52) U.S. Cl.
CPC .......... *H04L 9/3265* (2013.01); *H04L 9/3213* (2013.01); *H04L 9/3271* (2013.01); *H04L 43/10* (2013.01); *H04L 67/563* (2022.05); *H04L 67/63* (2022.05)

(58) Field of Classification Search
CPC ... H04L 9/3265; H04L 9/3213; H04L 9/3271; H04L 43/10; H04L 67/563; H04L 67/63; H04L 9/0825; H04L 9/3263; H04L 9/40; H04L 63/08
See application file for complete search history.

(56) References Cited

U.S. PATENT DOCUMENTS

| | | | |
|---|---|---|---|
| 7,305,562 B1 | 12/2007 | Bianco et al. | |
| 7,690,026 B2 | 3/2010 | Zhu et al. | |
| 8,752,150 B2 | 6/2014 | Ivanov et al. | |
| 9,641,341 B2 | 5/2017 | Oberheide et al. | |
| 10,231,134 B1 * | 3/2019 | Brisebois | H04L 43/087 |
| 11,503,012 B1 | 11/2022 | Yancey et al. | |

(Continued)

OTHER PUBLICATIONS

Microsoft, Authentication and authorization in Azure App Service and Azure Functions, Mar. 29, 2021, https://docs.microsoft.com/en-us/azure/app-service/overview-authentication-authorization.

(Continued)

*Primary Examiner* — Abu S Sholeman
(74) *Attorney, Agent, or Firm* — Standley Law Group LLP; Jeffrey S. Standley; Adam J. Smith

(57) ABSTRACT

Identity access and management ("IAM") systems with resiliency features and methods related to the same are provided. An identity proxy is interposed between user systems and each of two or more identity provider ("IDP") systems. The identity proxy routes authentication requests, challenges, and responses between the user systems and the IDP systems based on availability, and verifies challenge responses to permit access to data or services.

20 Claims, 11 Drawing Sheets

(56) References Cited

U.S. PATENT DOCUMENTS

| | | |
|---|---|---|
| 2005/0055552 A1 | 3/2005 | Shigeeda |
| 2006/0218628 A1 | 9/2006 | Hinton et al. |
| 2007/0074049 A1 | 3/2007 | Frenkel et al. |
| 2008/0126344 A1* | 5/2008 | Hoffman .............. G06Q 10/107 707/999.005 |
| 2008/0222714 A1* | 9/2008 | Wahl ....................... H04L 63/08 726/9 |
| 2009/0210930 A1 | 8/2009 | Lexcellent et al. |
| 2010/0325719 A1 | 12/2010 | Etchegoyen |
| 2011/0010560 A1 | 1/2011 | Etchegoyen |
| 2011/0067095 A1* | 3/2011 | Leicher ................... H04L 63/12 726/10 |
| 2012/0144034 A1* | 6/2012 | McCarty ............. H04L 63/0823 709/225 |
| 2012/0260322 A1 | 10/2012 | Logan et al. |
| 2015/0007263 A1 | 1/2015 | Stewart et al. |
| 2015/0113618 A1 | 4/2015 | Sinha et al. |
| 2015/0254450 A1* | 9/2015 | Ravi ....................... G06F 21/41 726/8 |
| 2016/0134599 A1* | 5/2016 | Ross ................... H04L 63/0815 713/168 |
| 2016/0135737 A1* | 5/2016 | Bowers .................. A61B 5/165 704/270 |
| 2017/0257360 A1* | 9/2017 | Gattu ...................... H04L 63/10 |
| 2018/0167383 A1* | 6/2018 | Mandyam ............... H04L 63/08 |
| 2018/0219679 A1 | 8/2018 | Debois et al. |
| 2019/0182242 A1 | 6/2019 | Aizikovich |
| 2019/0245693 A1 | 8/2019 | Iyer et al. |
| 2019/0372970 A1* | 12/2019 | Yan ........................ G10L 17/04 |
| 2019/0385129 A1 | 12/2019 | Jamkhedkar et al. |
| 2021/0306325 A1* | 9/2021 | Olden ................... H04L 63/102 |
| 2024/0114019 A1* | 4/2024 | Olden ................... H04L 63/0815 |

OTHER PUBLICATIONS

Microsoft, Choose the right authentication method for your Azure Active Directory hybrid identity solution, Oct. 30, 2019, https://docs.microsoft.com/en-us/azure/active-directory/hybrid/choose-ad-authn.

* cited by examiner

RESILIENCY ARCHITECTURE FOR IDENTITY PROVISIONING AND VERIFICATION

CROSS-REFERENCE TO RELATED APPLICATIONS

This application is a continuation of U.S. application Ser. No. 17/345,787 filed Jun. 11, 2021, the disclosures of which are hereby incorporated by reference as if fully restated herein.

TECHNICAL FIELD

Exemplary embodiments relate generally to resilient identity access and management ("IAM") systems, such as which use multiple identity providers ("IDP"), and methods related to operating the same.

BACKGROUND AND SUMMARY OF THE INVENTION

IAM is one of critical pillars of security and service provisioning in any organizations. As reliance on computerized systems to perform various tasks and provide access to important information increases, IAM has become particularly important and complex in relatively large organizations. At a high level, IAM generally involves verifying that an individual or entity requesting access is who the individual or entity represents themselves to be. This is sometimes referred to as "authentication". IAM generally manifests itself as the entry point of any access for customers, employees, vendors, partners, and external service providers of any organization, and/or any other individual or entity attempting to access one or more systems of the organization (hereinafter also referred to as a "user"). IAM life cycle management involves identity provisioning, access provisioning, identity verification, federated identity services, and terminating access—to name several examples.

To authenticate users, challenges may be issued by the IAM, and corresponding responses may be received from the users. Known challenge and response techniques include requesting and verifying: user names, passwords, security questions, answers, and images, security keys or other hardware devices, biometrics, tokens, cookies, network information, device information, and one time access codes, to name a few examples. It is known to use a single challenge and response or multiple challenges and responses of various types, (sometimes referred to as multi-factor authentication). The number and type of challenges and responses used may be based on preference and/or risk model analysis.

Authentication is generally handled by a trusted provider (e.g., the IDP), which may be owned, managed, operated and/or hosted by the organization itself or a third party. Examples of third-party IDPs include Microsoft® Azure® Active Directory services available from Microsoft Corporation of Redmond, Washington (azure.microsoft.com/en-us/services/active-directory/), Cisco® Identity Services Engine available from Cisco Technology, Inc. of San Jose, California (www.cisco.com/c/en/us/products/security/identity-services-engine/index.html), and/or Okta, Inc. of San Francisco, California (www.okta.com). The user may not be aware that it is actually interacting with the third-party as the interface may appear the same to the user. These IDP systems may be hosted in one or more cloud-based servers, though such is not required.

For example, when attempting to access a particular system of the organization, such as through an internet portal, the user may be requested to enter certain identifying information such as a user name, password, and one-time-access code sent to a mobile device associated with the user. The user provided responses may be compared to stored data at the IDP to identify the presence or non-presence of a match. If a match is determined, a token may be issued by the IDP which is presented to the organization's system to indicate that the user has been authenticated by the IDP. Cookies may sometimes be utilized by the organization, IDP, and/or user to permit the user ongoing access during a session. If no match is determined, no token may be issued and no access granted.

A single IAM system is sometimes used to provide access to multiple individual systems of an organization, such as through a common portal or single sign on ("SSO") solution to provide a federated authentication solution. In some cases, a variety of systems may each utilize different IDPs which are not easily integrated into a common, federated IAM solution.

Regardless, these IAM systems can consume significant network resources and can become a network bottleneck. Furthermore, IAM systems can become overwhelmed, such as where a higher-than-normal number of users are requesting access at a given time period, resulting in slow operations or downtime events. Additionally, like all other computerized systems, IAM systems are prone to downtime events or failure for a number of reasons. Since IAM is vital to the business operations of any organization, any service disruption of identity services, even where minimal, may result in the loss of revenue, reputation and customer confidence, or lack of access to mission critical information or services (e.g., emergency equipment) when it is needed to name some examples.

In today's world where organization are largely depending on native IDP services of cloud service providers, downtime of a single IDP can result a significant disruption of organization operations. Such disruptions have resulted in worldwide outages of critical applications during the 2020 and 2021 years, for example. These downtime events may occur for a number of reasons, at least some of which may be the result of overload due to an increase in authentication requests at a particular time. What is needed is a resilient IAM architecture.

IAM systems with resilient architecture features (hereinafter also the "resilient IAM system"), such as which permits switching between multiple IDP providers, and methods related to the same are provided. The present disclosure provides an architecture in which an organization can stay resilient amidst such IDP outages. The resilient IAM system of the present invention may utilize at least two different IDPs. Each of the at least two different IDPs may be hosted in disparate physical infrastructure for maximum fault tolerance. Each of the at least two different IDPs may mirror the identity credentials of a user base for fault resilience. In the event of a failure of any of the at least two different IDPs, the resilient IAM system may gracefully switch over to an alternate, operational one of the IDPs.

In exemplary embodiments, the identity credentials of the user base for an organization may be mirrored among two or more IDPs transparently. An identity proxy may be provided between the users and each of the multiple IDPs. The identity proxy may virtualize the users' identity experience—both where there is no failure and when there is failure of any of the multiple IDPs. Switching between the multiple IDPs may be provided in a seamless fashion from the user's perspective such that the user is not necessarily aware that they are moving between different IDP providers. The resilient IAM system may be used for any number and/or type of systems storing or operating any type or kind of data, application, services, combinations thereof, or the like for any number and/or type of industries. The IDPs may be hosted and/or managed by the organization itself (locally or remote), by one or more third-parties, combinations thereof, or the like. In exemplary embodiments, without limitation, the resilient IAM system, including the IDPs, may be cloud-based.

Authentication credentials for users of the organization's one or more systems may be reproduced at multiple IDPs. An identity proxy may be interposed between the user interface and the multiple IDPs. The identity proxy may be configured to switch between the multiple IDPs based on various criteria. The identity proxy may be configured to utilize a primary IDP unless and until one or more criteria is met, which may include, for example without limitation, operability of the primary IDP. In exemplary embodiments, without limitation, a heartbeat may be provided from all of the multiple IDPs to the identity proxy. These heartbeats may be provided at the same or different regular time intervals. Where a heartbeat is not received within the expected time by the identity proxy, a downtime event may be determined and future authentication requests may be routed to a secondary IDP. The identity proxy may be configured to accept tokens issued by any of the multiple IDPs. The identity proxy may be configured to resume directing authentication requests to the primary IDP upon resumed receipt of the heartbeat from the primary IDP. In other exemplary embodiments, without limitation, the heartbeats may only be provided from the primarily IDP, and upon loss thereof, the identity proxy may be configured to switch over to the secondary IDP, such as until the heartbeat resumes.

Alternatively, or additionally, the criteria for switching between the multiple IDPs may include, for example without limitation, the number of authentication requests received within a particular period of time, an amount of total capacity utilized by the primary IDP, reports of failed authentication request, manual action, automatic action, combinations thereof, or the like. This may permit preemptive action to avoid a potential downtime event. As another example, without limitation, the identity proxy may alternatively or additionally provide load balancing or distribution such as automatically distributing authentication requests between the multiple IDPs, such as but not limited to, periodically, randomly, combinations thereof, or the like.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
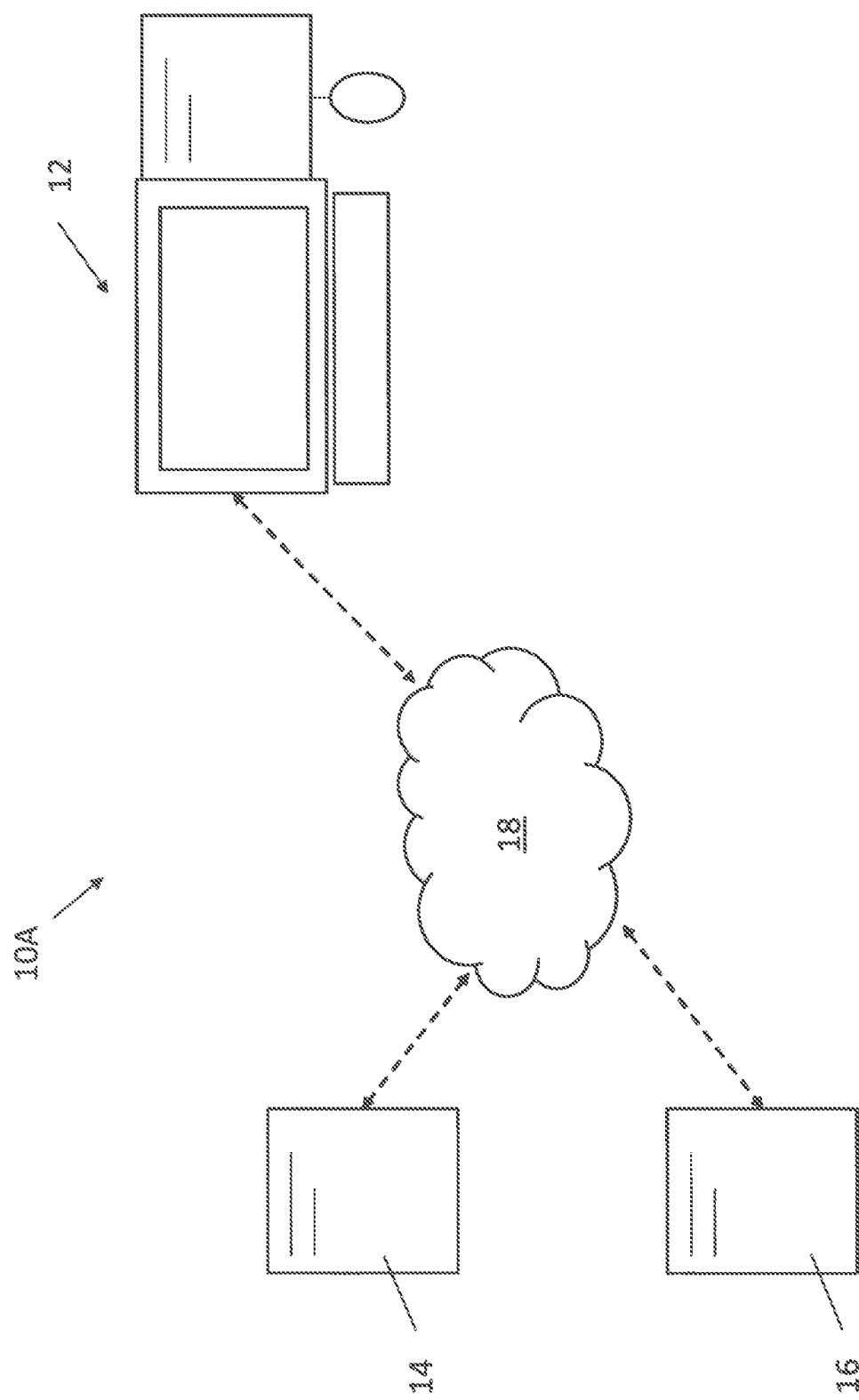
FIG. 1 is a plan view of a prior art IAM system.

FIG. 1 is a plan view of an exemplary conventional identity access and management (hereinafter also "IAM") system 10A. An individual or entity 12 (hereinafter also the "user") may request access to a system 16 which may be owned, operated, hosted, and/or managed by an individual or organization (hereinafter also the "organization"). The request may be routed to an identity provider 14 (hereinafter also the "IDP") to authenticate the user. The IDP 14 may issue one or more challenges requesting the user 12 provide certain information to authenticate its purported identity. The user 12 may provide such information by way of one or more responses. If the one or more responses match user records held by the IDP 14, access may be granted. If not, access may be denied.

Access may be provided by issuance of a token from the IDP 14 to the user 12, which the user 12 may present to the system 16 to demonstrate that it has been authenticated by the IDP 14. The system 16 may issue a cookie to the user 12 to permit ongoing access during a session. The system 16 or organization may be in a trust relationship with the IDP 14. The IDP 14 may comprise a mirrored copy or sole copy of the records for the organization of the users authorized to access the system 16, and associated proper challenge responses.

The user 12, IDP 14, and/or system 16 may each comprise, or be hosted on, one or more computerized systems, including but not limited to, a personal computer, server, database, processor, electronic storage device, tablet, smartphone, combinations thereof, or the like. Communications between each of the user 12, IDP 14, and/or system 16 may be made by way of one or more networks 18. The network(s) 18 may comprise one or more of an internet, intranet, world wide web, cellular network, combinations thereof, or the like and may be wired, wireless, combinations thereof, or the like. While a single user 12 is illustrated, multiple users 12 of the same or different type may be authenticated using the IAM system 10A.

The requests from the IDP 14 and the responses received from the user 12 may be communicated to/from the IDP 14 without the user 12 knowing that it is communicating with the IDP 14, rather than the system 16 or the organization directly. For example, the challenges and responses may be gathered through an internet portal which appears as part of the organization. The IDP 14 may be owned, managed, and/or operated by the organization or a third-party.

The IDP 14 may be located on the organization's premises, such as in an organization owned, managed, and/or operated datacenter, or may be remote therefrom. The IDP 14 may be provided at a cloud system or may be a dedicated, enterprise system.

Figure 2:
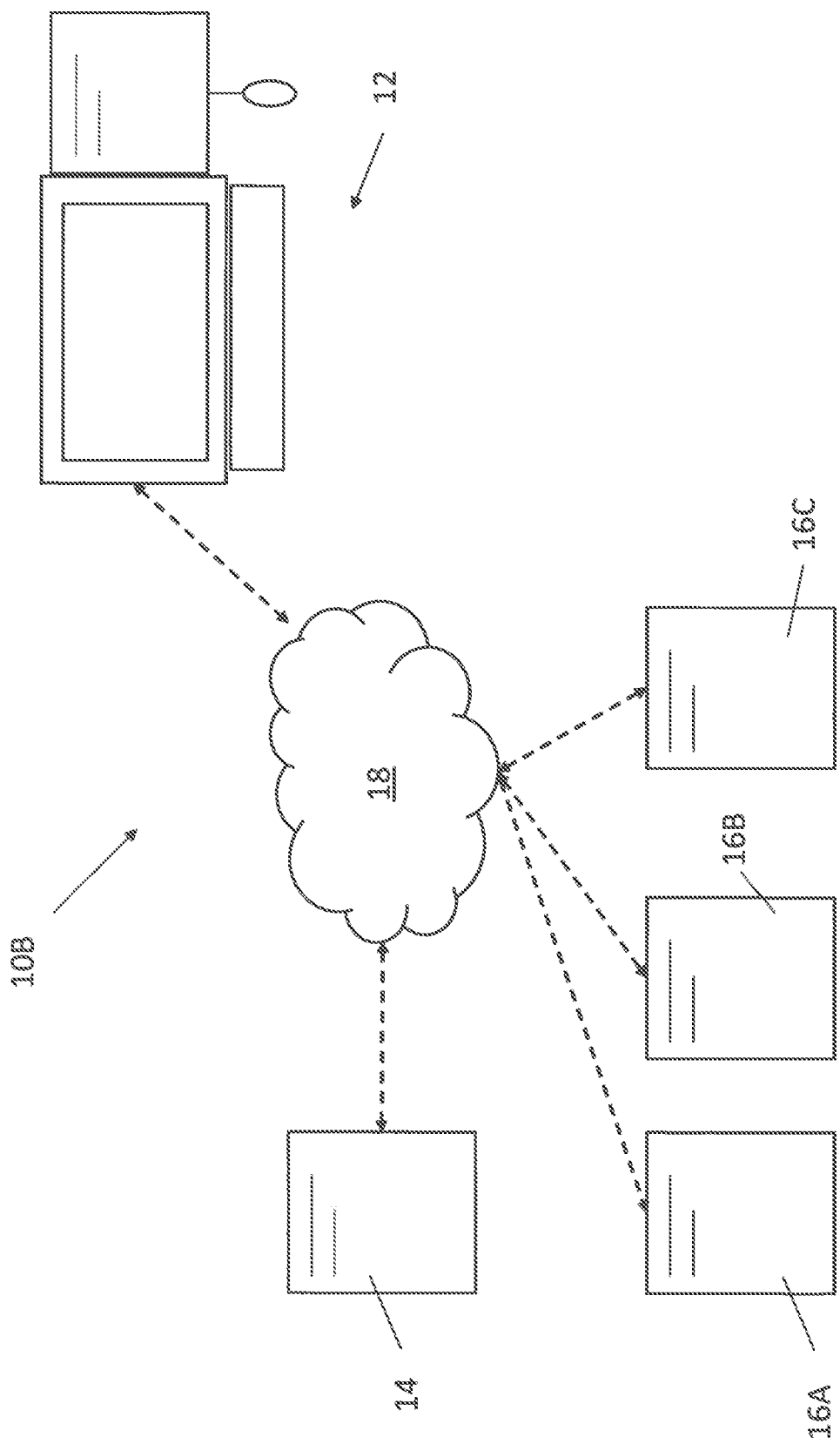
FIG. 2 is a plan view of another prior art IAM system providing a SSO feature.

FIG. 2 illustrates another embodiment of the IAM system 10B, which may provide access to multiple systems 16A, 16B, 16C of the organization, or multiple organizations, through the IDP 14. For example, each system 16 may provide access to certain information, software, applications (software-as-a-services (hereinafter also "SaaS")) or otherwise, combinations thereof, or the like. The IAM system 10B may provide a SSO or federated authentication solution.

Figure 3:
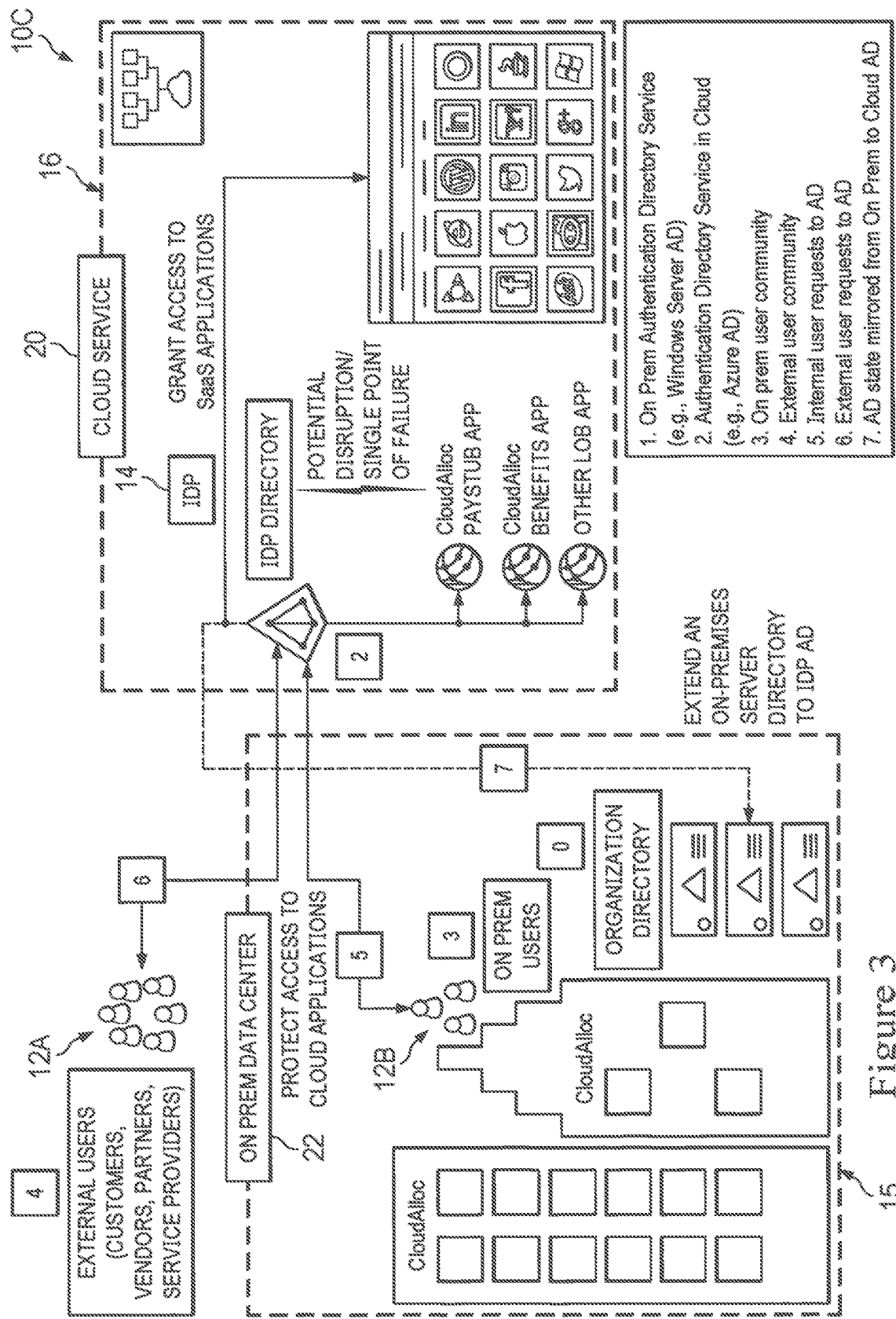
FIG. 3 is a system diagram of an exemplary embodiment of the prior art IAM systems of FIGS. 1-2.

FIG. 3 illustrates another embodiment of the IAM system 10C. Certain users 12A may be external to the organization, and other users 12B may be internal to the organization. The organization may include an on-premises data center 22 which may host a database 15 of users 12 authorized to access certain systems 16. The database 15 may comprise authentication information for each user. Such authentication information may include, for example, user names, passwords, security questions, answers, and images, security keys or other hardware devices, biometrics, tokens, cookies, network information, device information, one time access codes, combinations thereof, or the like. This information may be mirrored to the IDP 14. The systems 16 and/or IDP 14 may be hosted by one or more cloud services 20. The database 15 may be mirrored to the IDP 14 where there is compatibility.

Figure 4:
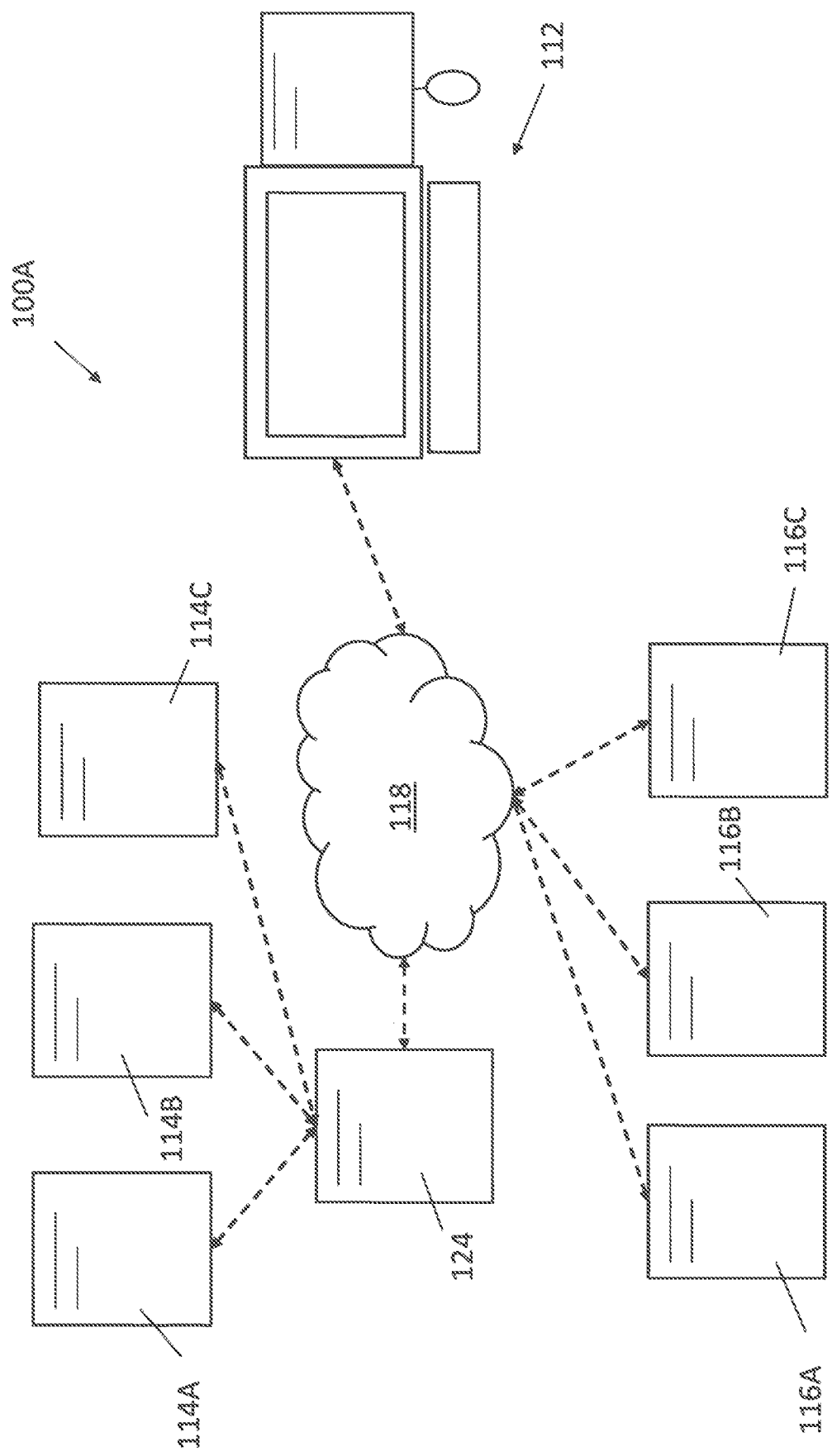
FIG. 4 is a plan view of an exemplary resilient IAM system utilizing multiple IDPs in accordance with the present invention.

FIG. 4 illustrates an IAM system with resilient architecture features 100A (hereinafter also the "resilient IAM system") in accordance with the present invention. Similar components may be numbered similarly but increased by 100 (e.g., 12 to 112). The resilient IAM system 100A may comprise multiple IDPs 114A, 114B. An identity proxy 124 may be interposed between a user 112 and each of the multiple IDPs 114. The identity proxy 124 may also be interposed between the user 1112 and/or systems 116A, 116B, 116C. In this manner, access requests from the user 112 for any of the systems 116 may be routed through the identity proxy 124 for authentication by any of the IDPs 114. Such interposition may be accomplished by hardware (e.g., communication pathways) and/or software routines (e.g., commands). Alternatively, or additionally, authentication related communications may be formatted such that they must necessarily pass through the identity proxy 124 to be properly interpreted by the IDPs 114 and/or user 112.

The identity proxy 124 may be configured to route authentication requests from users 112 between the multiple IDPs 114. The identity proxy 124 may comprise, or be hosted on, one or more computerized systems such as but not limited to, computers, servers, electronic storage devices, combinations thereof, or the like. The identity proxy 124 may be owned, operated, and/or managed by the organization or a third-party. The identity proxy 124 may be hosted by on-premises datacenter(s) 112 for the organization, remote therefrom, or may be hosted by one or more cloud services 120. One or multiple systems 116 may be utilized. One or multiple users 112 may be authenticated. Two, three, four, or any number of IDPs 114 beyond just one may be utilized. The identity proxy 124 may be in electronic communication with the users 112, systems 116, and/or IDPs 114, such as by way of one or more networks 118.

Figure 5:
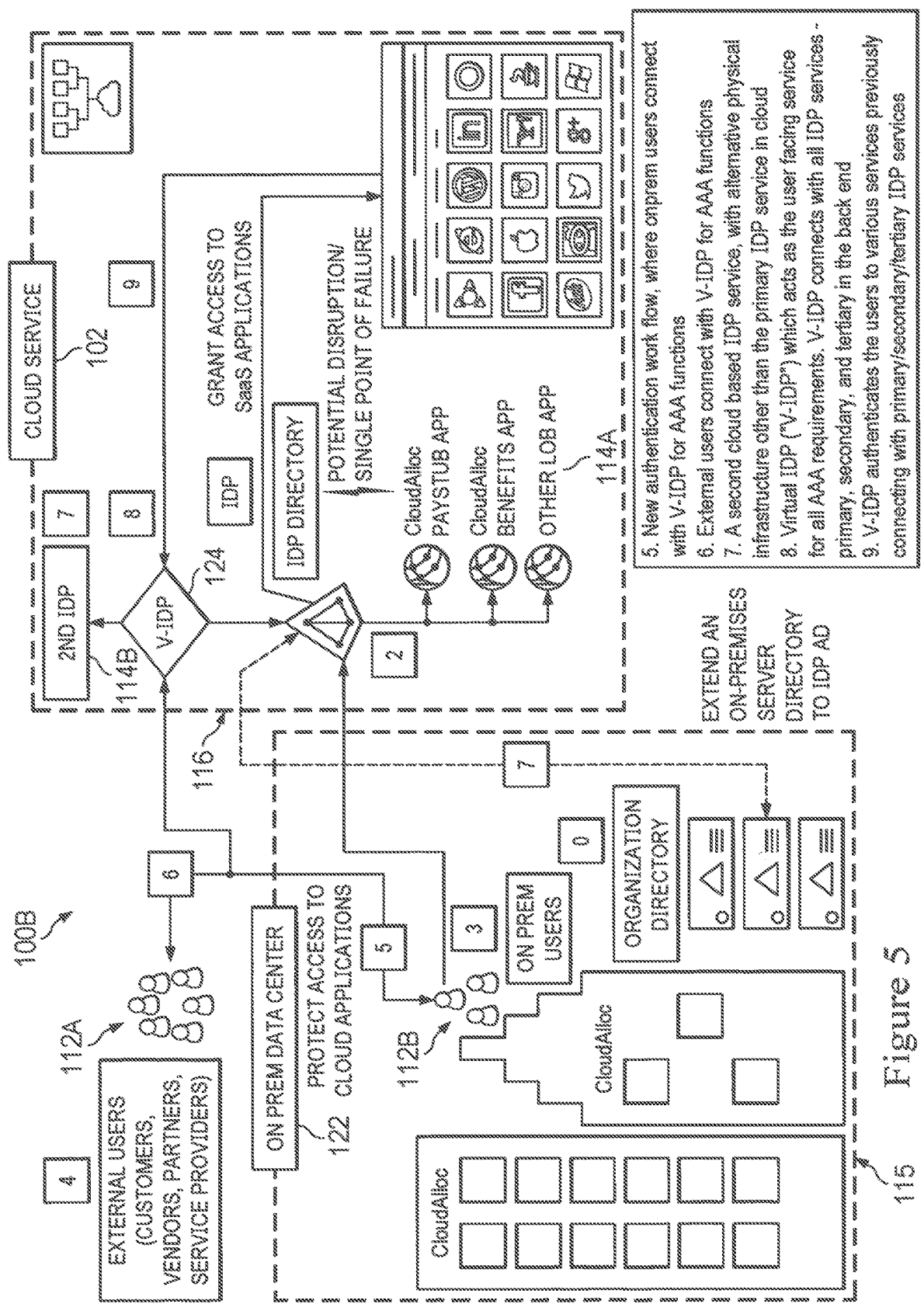
FIG. 5 is a system diagram of an exemplary embodiment of the resilient IAM system of FIG. 4.

FIG. 5 illustrates another exemplary embodiment of the resilient IAM system 110B in accordance with the present invention. Users 112A, 1128 may be internal or external to the organization. Authentication information for users 112 authorized to access the systems 116 may be stored at one or more databases 115 and may be mirrored, or otherwise copied over, to each of the multiple IDPs 114A, 114B. In exemplary embodiments, without limitation, the database(s) 115 may be hosted by an on-premises datacenter 112. Alternatively, the authentication information may be stored at the multiple IDPs 114A, 114B such that the database 115 is not necessarily required. The database 115, where used, may be compatible with each of the multiple IDPs 114. The datacenter 115 may comprise a legacy IDP for the organization, though such is not required. At least the user base authentication data from the legacy IDP may be stored at each of the multiple IDPs 114. The authentication information may be synched between the database 115 and/or each of the multiple IDPs 114 and/or between the multiple IDPS 114. While two IDPs 114A, 114B are illustrated, any number of IDPs 114 above just one may be utilized.

The multiple IDPs 114 may be arranged into a hierarchy. For example, one of the IDPs 114 may be designated as a primary IDP 114A and another one of the multiple IDPs 114 may be designated as a secondary or backup IDP 1148. Where more than two IDPs 114 are utilized, the hierarchy may likewise continue (e.g., tertiary IDP, etc.). The identity proxy 124 may be configured to direct requests to the various IDPs 114 based on such an established hierarchy. For example, without limitation, the identity proxy 124 may be configured to direct requests to the primary IDP 114A unless and until certain criteria are met as further explained herein. This may include a disruption or other downtime event of the primary IDP 114A, overloading of the primary IDP 114A, a certain number of authentication requests has been sent to the primary IDP 114A, combinations thereof, or the like.

Some or all of the multiple IDPs 114 may be hosted at one or more cloud servers 102, though such is not required. In exemplary embodiments, each of the multiple IDPs 114 are hosted in physically disparate structure. Alternatively, or additionally, each of the multiple IDPs 114 may be hosted or otherwise provided by different parties. Some or all of the systems 116 may be hosted at one or more cloud servers 102, though such is not required. The database 115 may be hosted at one or more on-premise data centers 122, though such is not required. The identity proxy 124 may be hosted at one or more cloud servers 102, though such is not required.

Figure 6A:
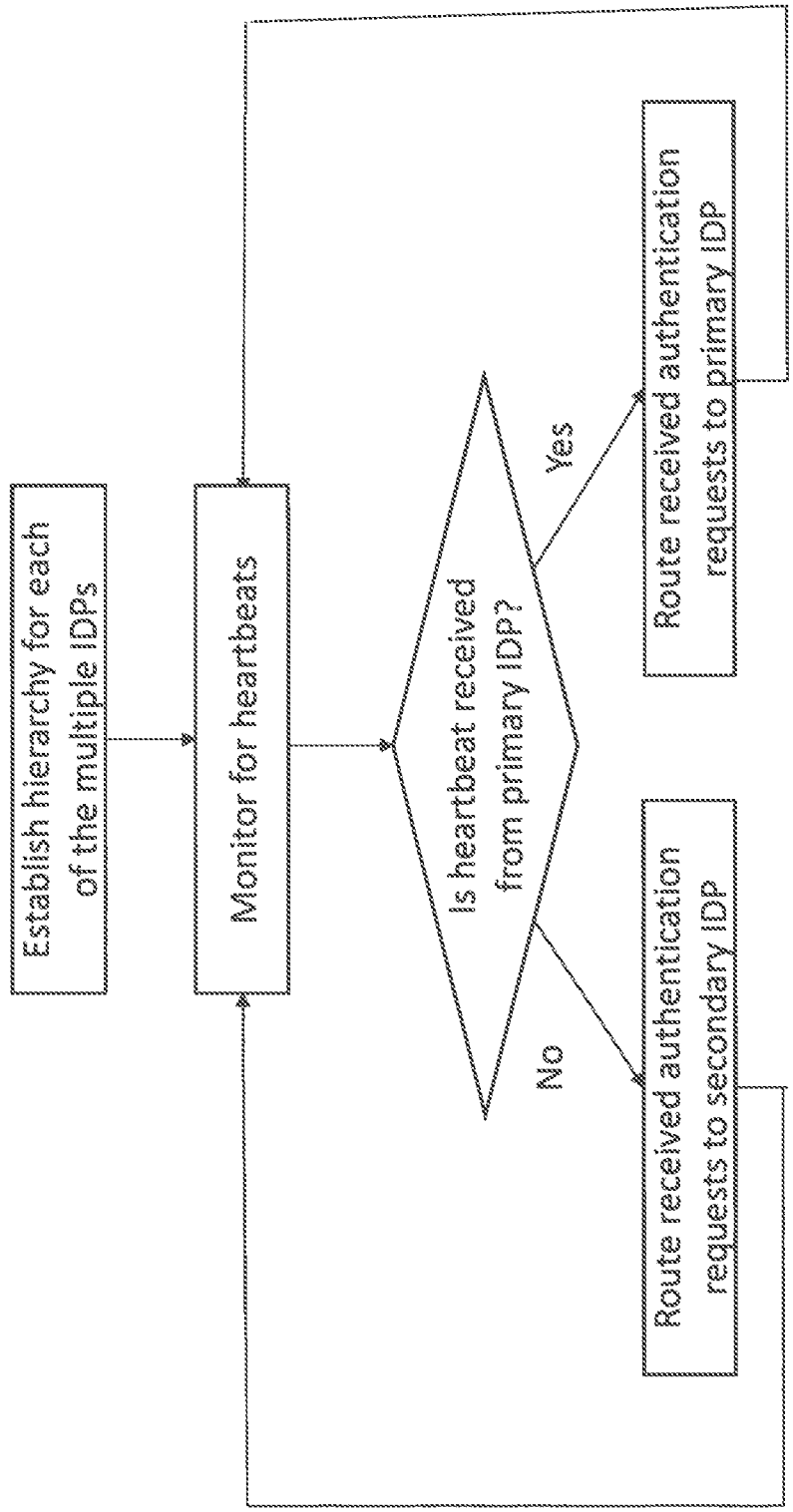
FIG. 6A is a flow chart with exemplary logic for operating the resilient IAM systems of FIGS. 4-5.

FIG. 6A illustrates exemplary logic for operating the resilient IAM systems 110A, 110B. One of the multiple IDPs 114 may be designated as primary, and another of the multiple IDPs 114 may be designated as secondary, tertiary, etc. in a hierarchy for each of the IDPs 114 utilized with the resilient IAM system 110. At least the primary designated one of the multiple IDPs 114 may be configured to regularly transmit a heartbeat to the identity proxy 124 to establish its operational status. In exemplary embodiments, each of the multiple IDPs 114 are configured to regularly transmit a respective heartbeat to the identity proxy 124. So long as the expected heartbeats are received at the identity proxy 124 from at least the primary designated one of the multiple IDPs 114, the identity proxy 124 may be configured to route authentication requests received from the users 112, as well as any challenges and/or responses related to the same, to the primary designated one of the multiple IDPs 114. If the heartbeat is not received from at least the primary designated one of the multiple IDPs 114, the identity proxy 124 may be configured to begin routing authentication requests received from the users 112, and/or any challenges and/or responses related to outstanding authentication requests, to the secondary designated one of the multiple IDPs 114. Upon resumption of one or more heartbeats from the primary designated one of the multiple IDPs 114, the identity proxy 124 may be configured to resume routing of authentication requests received from the users 112 to the primary designated one of the multiple IDPs 114.

While discussion is occasionally made herein with regard to a primary and secondary IDP 114, the same logic may be used up and down the hierarchy with any number of IDPs 114 until the list of available IDPs 114 is exhausted. For example, without limitation, if the primary and secondary designated IDP 114 go down, a tertiary IDP 114 may be utilized. The tertiary IDP 114 may be utilized until the secondary or primary IDP 114 comes back online. Progression through the hierarchy may be linear (e.g., primary to secondary to tertiary to secondary to primary) or non-linear (e.g., primary to secondary to tertiary to primary).

Each of the multiple IDPs 114 may be configured to transmit the heartbeats to the identity proxy 124 in exemplary embodiments, such as at certain intervals, which may be the same or different and may vary. The identity proxy 124 may be configured to anticipate these heartbeats from each of the multiple IDPs 114, such as within a margin of time. The margin of time may be set to preference levels, account for relatively minor delays in signaling, combinations thereof, or the like. In exemplary embodiments, without limitation, the identity proxy 124 may be configured to switch to the secondary designated one of the multiple IDPs 114 upon missing a single one of the anticipated heartbeats. In other exemplary embodiments, without limitation, the identity proxy 124 may be configured to not switch to the secondary designated one of the multiple IDPs 114 until multiple heartbeats are missed, such as in a row, within a particular time frame, or within a predetermined number of heartbeats. The identity proxy 124 may be configured to continually monitor the operational status of each of the multiple IDPs 114. The heartbeat signal from each of the multiple IDPs 114 may have one or more unique characteristics such that the identity proxy 124 may distinguish between the various received heartbeats. Alternatively, the identity proxy 124 may be configured to monitor only the operational status of the currently designated one of the multiple IDPs 114.

The heartbeat may be any type or kind of electronic signal configured to indicate operational status. For example, without limitation, each heartbeat may be a ping, an authentication request, or an arbitrary data signal. The heartbeat may be the same or different across the multiple IDPs 114. The multiple IDPs 114 need not transmit the heartbeat at the same interval at all times. For example, without limitation, each of the IDPs 114 may transmit their respective heartbeats at different times or intervals, which may be altered. The identity proxy 124 may be configured to monitor for heartbeats within particular windows of time, which may be regular intervals or a particular period of time from the last received one of the heartbeats, for example. Other techniques for monitoring operational status of the multiple IDPs 114 may be utilized. The heartbeats may be provided continuously, periodically, and/or upon request by the identity proxy 124.

In exemplary embodiments, without limitation, the heartbeats may only be provided from the primary designated one of the multiple IDP 114. Upon loss of heartbeat from the primary designated one of the multiple IDP 114, the identity proxy 124 may be configured to begin routing operations to the secondary designated one of the multiple IDPs 114. The identity proxy 124 may be configured to resume operations with the primary designated one of the multiple IDP 114 when the heartbeat from the primary designated one of the multiple IDP 114 resumes. Heartbeats in such embodiments need not be transmitted from the secondary designated one of the multiple IDPs 114, though such heartbeats may be used in exemplary embodiments to verify operational status of the secondary designated one of the multiple IDPs 114, such as prior to switching operations. In some embodiments, the identity proxy 124 may be configured to issue requests to the various ones of the IDPs 114 for heartbeats or other indications of operational status.

Figure 6B:
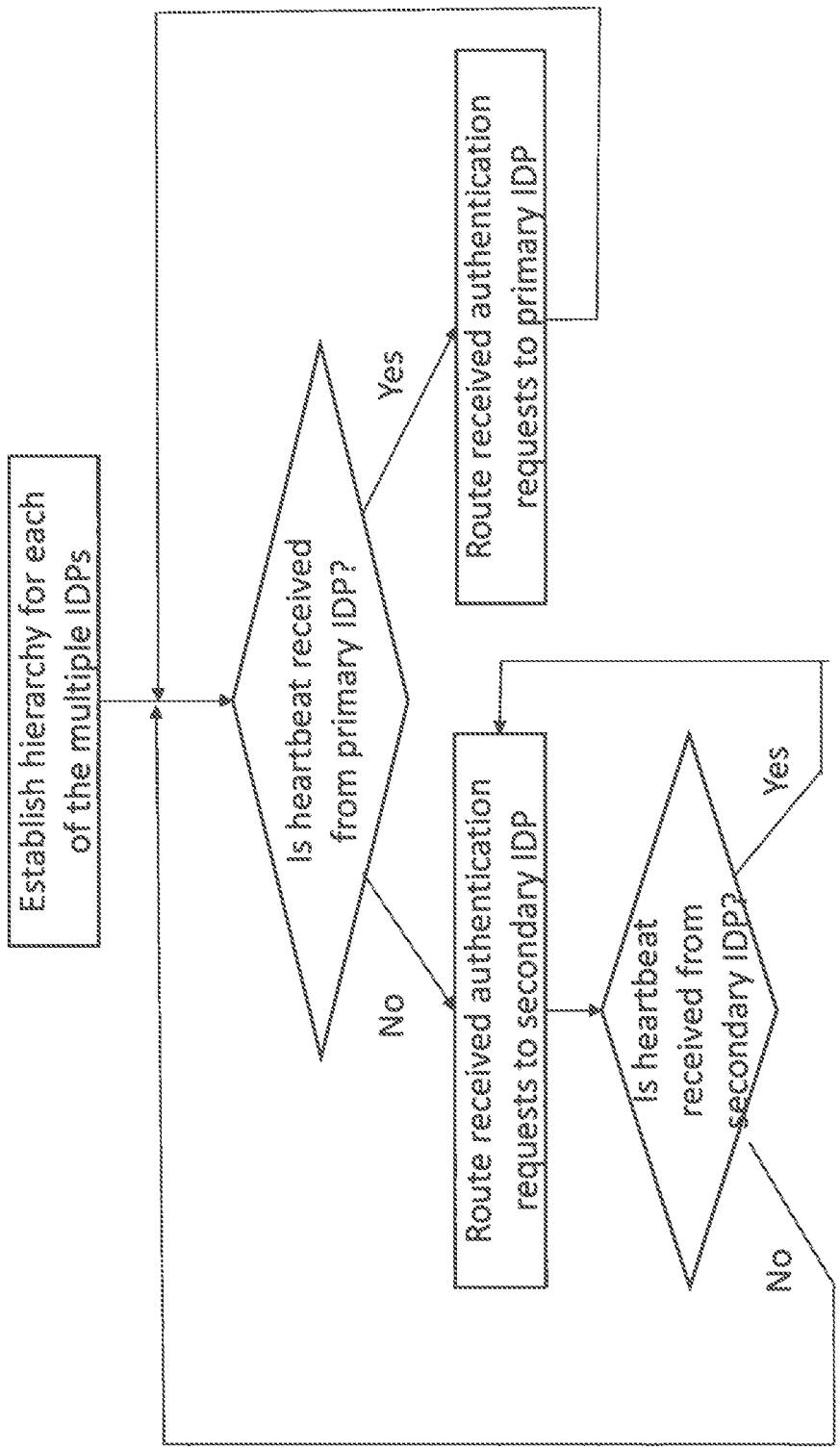
FIG. 6B is a flow chart with other exemplary logic for operating the resilient IAM systems of FIGS. 4-5.

FIG. 6B illustrates alternative logic for operating the resilient IAM system 110. The identity proxy 124 may be configured to continue routing authentication requests received from the users 112 to whichever one of the multiple IDPs 114 is currently being utilized, even where a heartbeat has been received from the previously utilized one of the multiple IDPs 114, until that particular one of the multiple IDPs 114 is found to be experiencing a downtime event, for example. For example, operations with the primary designated one of the multiple IDPs 114 may not immediately resume when the primary designated one of the multiple IDPs 114 comes back online, but instead switching back to the primary designated one of the multiple IDPs 114 may instead only occur when the currently utilized one of the multiple IDPs 114 (e.g., the secondary designated one of the multiple IDPs 114) experiences a downtime event or is otherwise determined to be unavailable, such as by loss of a heartbeat signal.

While discussion is sometimes made herein with regard to loss of a heartbeat signal as an indication of operational disruption, inconsistent, irregular, or otherwise unanticipated heartbeat signals may likewise be used to indicate operational disruption and trigger switching between the multiple IDP 114.

Figure 7:
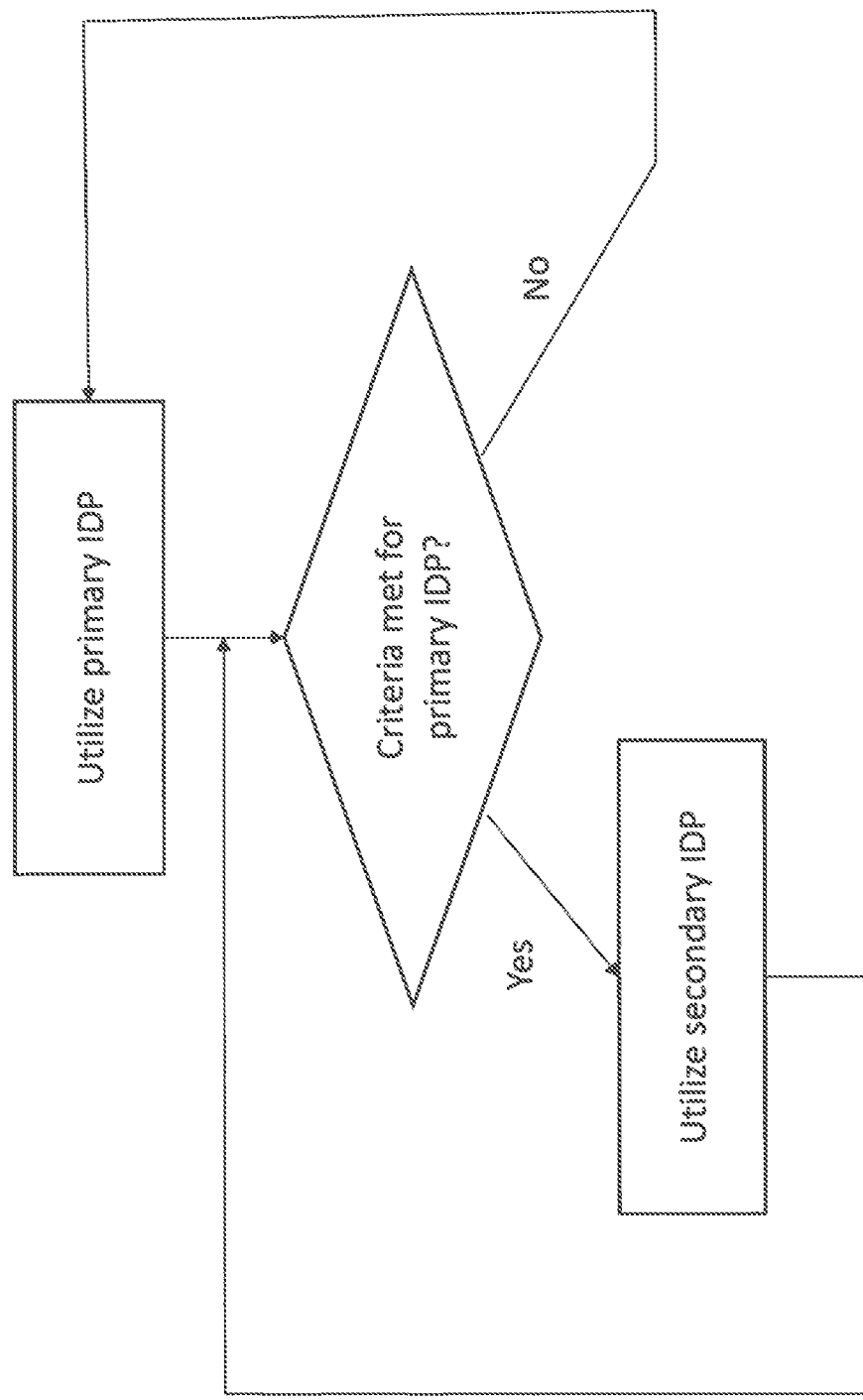
FIG. 7 is a flow chart with other exemplary logic for operating the resilient IAM systems of FIGS. 4-5.

FIG. 7 illustrates alternative logic for operating the resilient IAM system 110. The identity proxy 124 may be configured to utilize a primary designated one of the multiple IDPs 114 unless and until certain criteria is met, at which time the identity proxy 124 may be configured to utilize a secondary designated one of the multiple IDPs 114. The criteria may include a percentage of operating capacity utilized at the primary designated one of the multiple IDPs 114, the number of authentication requests transmitted to the primary designated one of the multiple IDPs 114 within a given time period, a date, a time, combinations thereof, or the like.

The identity proxy 124 may be configured to switch back to the primary IDP 114 once the criteria is no longer met. Alternatively, the identity proxy 124 may be configured to continue using the secondary or other IDP 114 currently being utilized until the criteria is met for the currently utilized one of the multiple IDPs 114. The criteria may be a number, range, window, threshold, maximum, minimum, average, median, mode, combinations thereof, or the like.

In other exemplary embodiments, without limitation, the identity proxy 124 may be configured to regularly or randomly distribute authentication requests between the multiple IDPs 114, such as for load balancing.

While a primary and secondary designated one of the multiple IDPs 114 is discussed, the logic may be used with any number of IDPs 114. For example, without limitation, if a first and second one of the multiple IDPs 114 are determined to meet the same or different criteria, the identity proxy 124 may be configured to route received authentication requests to a third IDPs 114.

Figure 8:
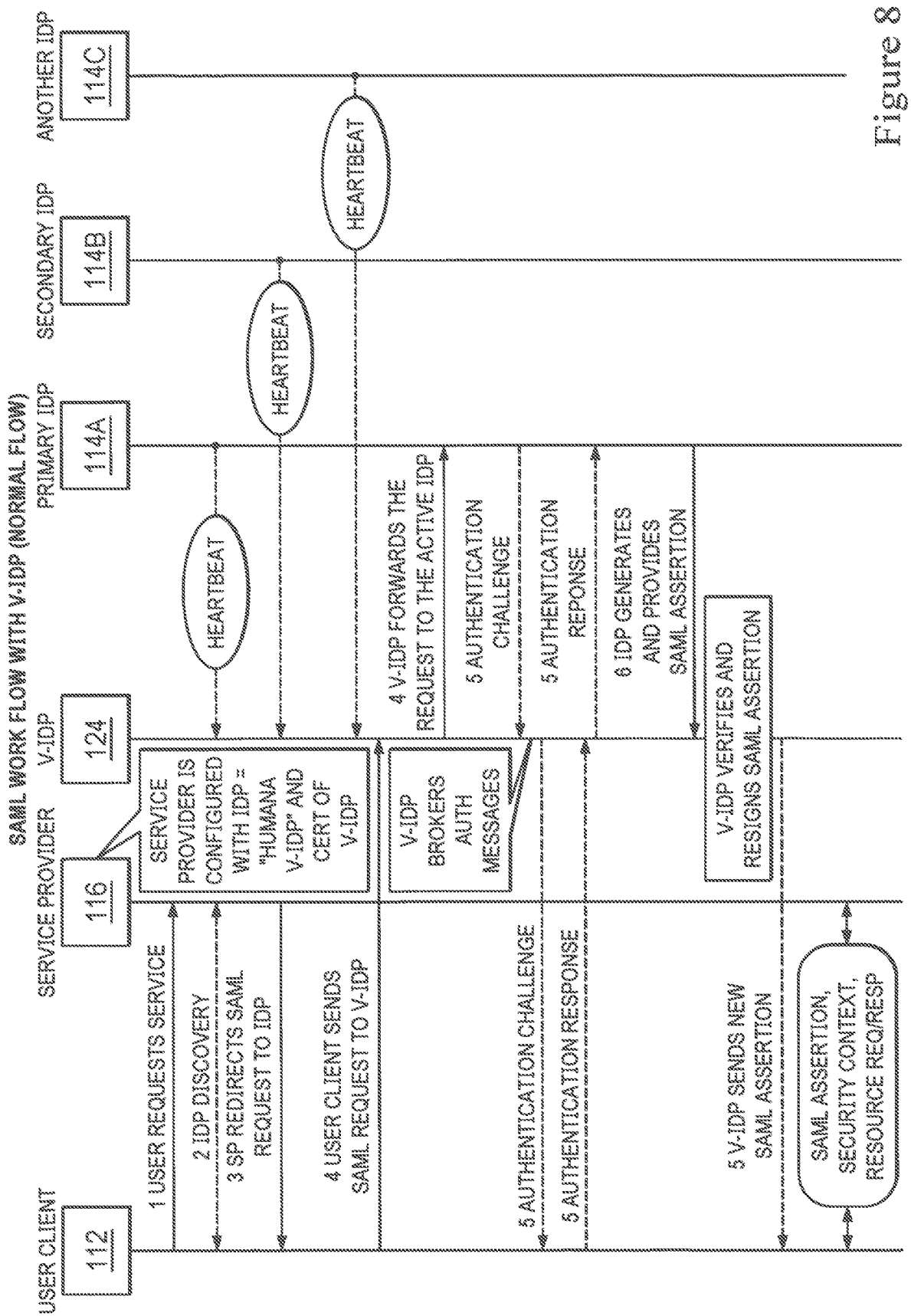
FIG. 8 is an exemplary workflow for the exemplary resilient IAM systems of FIGS. 4-5 where the primary IDP is active, and illustrating routing of authentication requests to the primary IDP.

FIG. 8 illustrates an exemplary workflow using the identity proxy 124 and the multiple IDPs 114A, B, C. User requests for access to the systems 116 may be provided between the users 112 and the systems 116. Before access is granted, authentication challenges and responses may be passed between the users 112 and the identity proxy 124. The identity proxy 124 may be a virtual IDP such that the user 112 is unaware of which of the multiple IDPs 114 the user 112 is interacting with. Further, the user 112 may be unaware that they are interacting with the identity proxy 124 or an IDP 114 altogether as the authentication requests, challenges, responses, and the like may be handled through a portal, such as but not limited to an internet portal, that appears unchanged to the user 112.

The identity proxy 124 may be configured to forward the authentication requests, challenges, responses, and other information between the identity proxy 124 and the first, primary designated, highest ranking, and/or currently utilized one of the multiple IDPs 114 currently designated as available. Heartbeats may be received from each of the IDPs 114 at the identity proxy to establish availability based on operational status. Alternatively, or additionally, criteria may be tracked by the identity proxy 124 and/or provided by the IDPs 114 to establish availability.

Tokens or other authentication certification items may be provided from the authenticating one of the multiple IDPs 114 to the user client 112 by way of the identity proxy 124. In exemplary embodiments, the tokens may comprise SAML/OAUTH tokens. These tokens, or other authentication certification items, may be presented by the user 112 to the system(s) 116, which may be configured to grant access upon receipt of the same. Cookies, or other items indicating a prior grant of access, may be issued by the system(s) 116 to the client 112, such as to permit ongoing access during a session.

In exemplary embodiments, some or all of the data received at the identity proxy 124 may be mirrored or otherwise copied across the multiple IDPs 114. For example, without limitation, the access requests, challenges, responses, tokens, cookies, combinations thereof, or the like may be provided from the identity proxy 124 to each of the multiple IDPs 114 for storage such that upon switching to a different one of the multiple IDPs 114, the user 112 may be recognized and/or operations may continue in a seamless fashion. Some or all of such data may alternatively or additionally be copied over to the database 115. This may be accomplished in substantially real time, and/or after each exchange of information. In this way, a different one of the multiple IDPs 114 may be positioned to take over authentication operations for any other one of the multiple IDPs 114 no matter which step the disrupted IDP 114 is in the authentication process.

In exemplary embodiments, without limitation, users 112 may register their identity and authentication credentials with the primary IDP 114A and/or the database 115. The credentials may be mirrored in the other IDPs 114, such as the secondary and tertiary IDPs 114B, 114C. Applications 116 which authorize users 112 for access may register within the identity proxy 124 (also referred to herein as the "V-IDP" and/or "virtual IDP") as their authentication service provider. This may be accomplished by installing a PKC of V-IDP 124 in the servers for the applications 116.

Exemplary authentication workflow with SAML (OAUTH) may use a sequence of interactions, such as shown in FIG. 8. First, a user 112 may contact one of the applications 116 for access. The application 116 may in turn redirect user's SAML (OAUTH) request to the V-IDP service 124. The V-IDP 124 may forward the request to the primary IDP 114A. Authentication challenges from the primary IDP 114A may be encrypted with a public key of the V-IDP 124, for example, which may forward the challenges to the user 112, such as after re-encryption. Responses from the user 112 may be received by the V-IDP 124, which may forward them to the primary IDP 114A, which may in turn respond with a SAML assertion authorizing the user 112. The V-IDP 124 may forward the SAML assertion to the user 112, who may use it to access the service from the original application 116 contacted.

When sending and/or receiving authentication challenges, authentication responses, SAML assertions, combinations thereof, or the like, the V-IDP 124 may be configured to decrypt the messages received and re-encrypts them, such as by using an organization issued certification and key, to indicate the V-IDP 124 as the sending party. Other identifications of the transmitting party may be utilized. When sending and/or receiving authentication challenges, authentication responses, SAML assertions, combinations thereof, or the like, the primary IDP 114A may challenge the user 112 requesting access with multi-factor challenges which may include a password, plus one or more of the following: device ID, OTP, hardware key, trusted device and/or biometrics such a facial, voice, fingerprint for example, without limitation.

Figure 9:
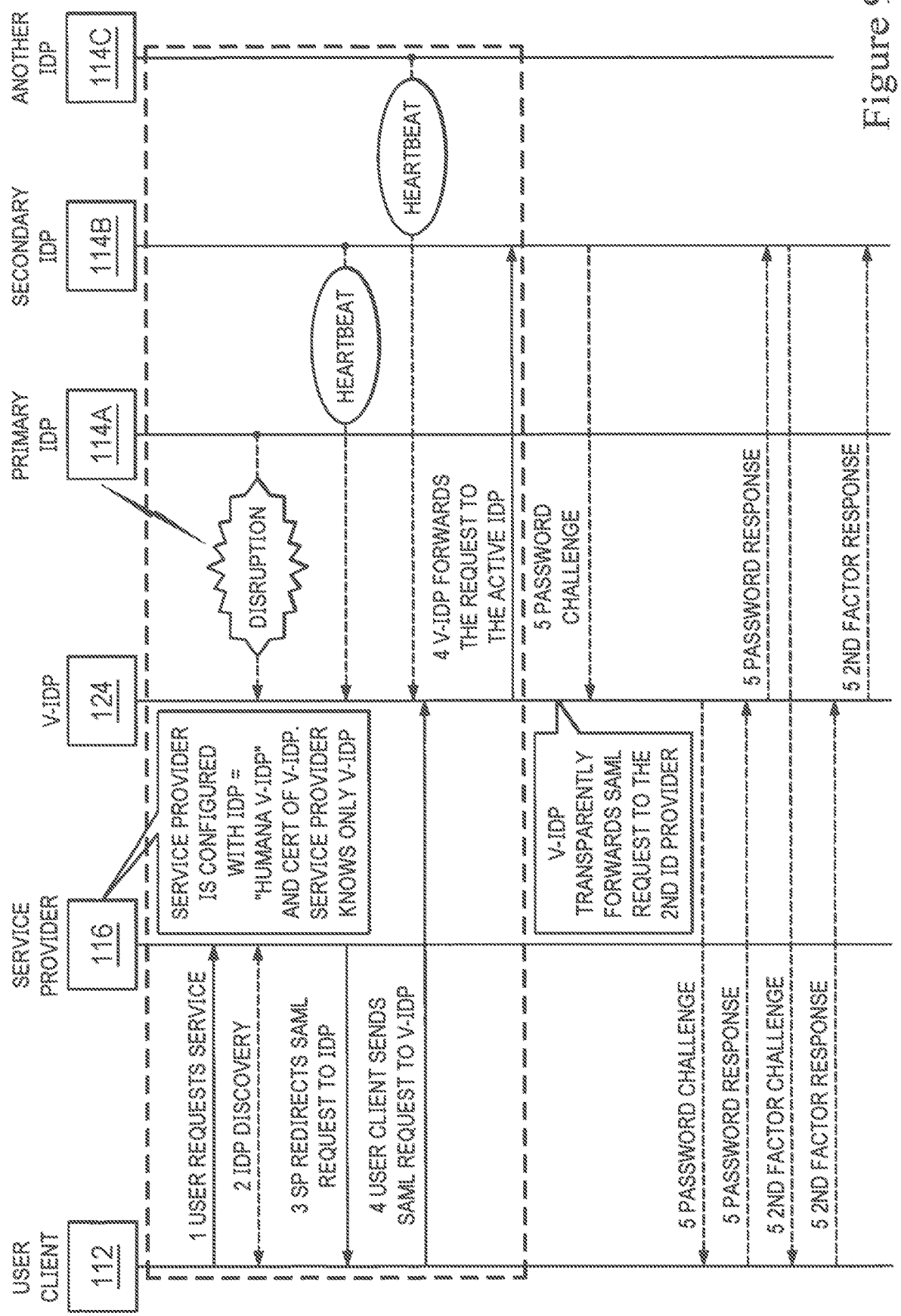
FIG. 9 is an exemplary workflow for the exemplary resilient IAM systems of FIGS. 4-5 where the primary IDP is disrupted, and illustrating the routing of identity challenges between a secondary IDP and the user.
Figure 10:
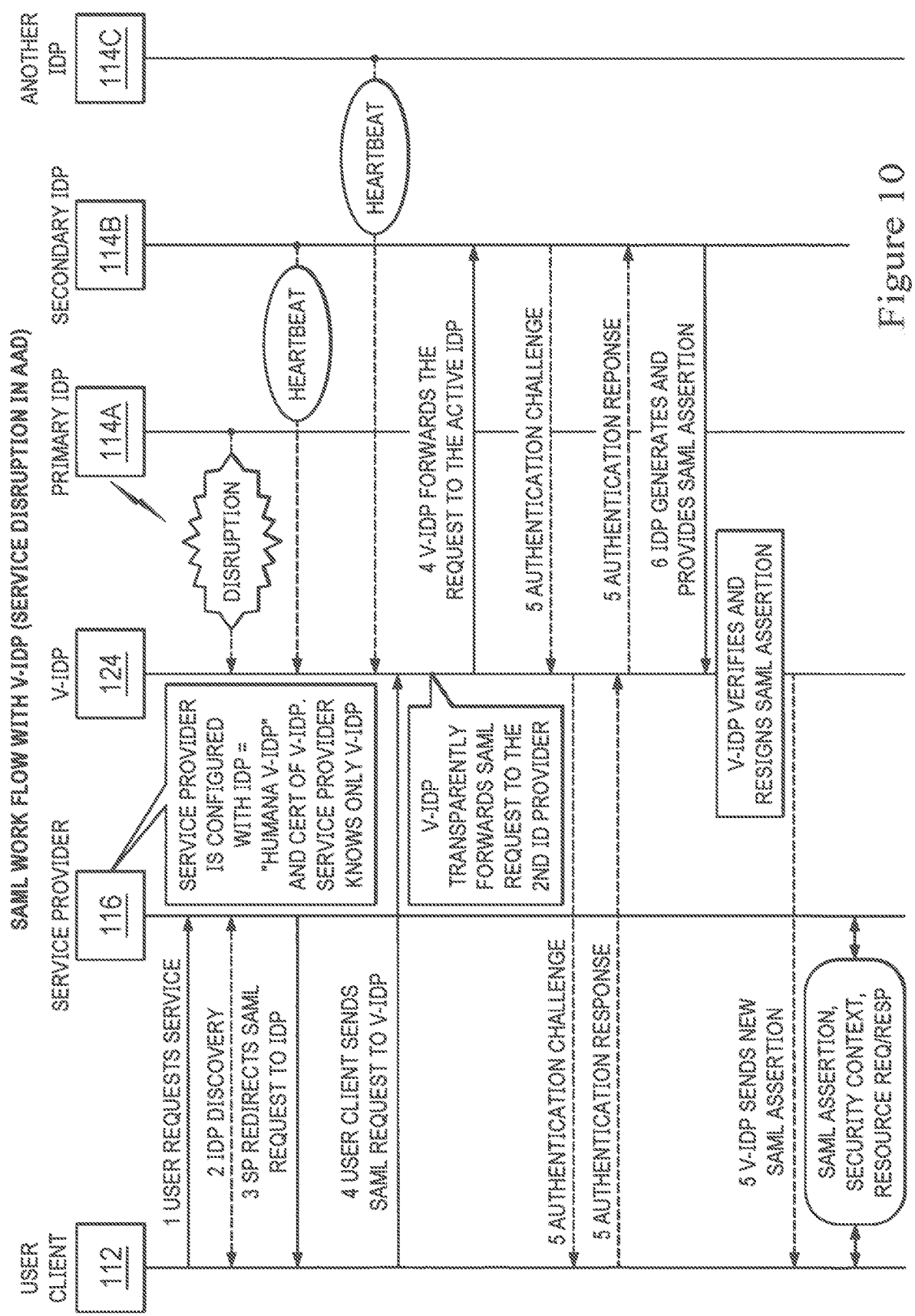
FIG. 10 is an exemplary workflow for the exemplary resilient IAM system of FIGS. 4-5 where the primary IDP is disrupted, and illustrating routing of further authentication requests to the secondary IDP.

As illustrated in FIG. 9 and FIG. 10, upon determination that a first, primary designated one, highest ranked one, and/or currently utilized one of the multiple IDPs 114A is experiencing a disruption, a downtime event, is unavailable, and/or is meeting certain criteria, the identity proxy 124 may be configured to begin routing authentication requests to a next available one of the multiple IDPs 114, which may be a second, secondary one, second highest ranked one, and/or not currently utilized one of the multiple IPDs 114B. The same or similar process may be utilized for any number of multiple IDPs 114, such as but not limited to a tertiary IDP 114C.

Each of the multiple IDPs 114 may be configured to issue the same or similar tokens or authentication documents. Alternatively, or additionally, each of the systems 116 may be configured to accept tokens or authentication documents from any of the multiple IDPs 114.

A single or multiple authentication challenges and responses or other authentication techniques may be utilized. Any number or type of authentication techniques may be utilized such as but not limited to user names, passwords, security questions, answers, and images, security keys or other hardware devices, biometrics, tokens, cookies, network information, device information, and one time access codes, to name a few examples. Some or all of the multiple IDPs 114 may be configured to run various risk models to determine the type, kind, or number of authentication factors to utilize, which may be the same or difference across the multiple IDPs 114.

In exemplary embodiments, each of the multiple IDPs 114 are hosted on physically disparate infrastructure, such as but not limited to, different cloud service providers 120, though such is not required. The identity proxy 124 may act as a trusted proxy for each of the one or more systems 116. The identity proxy 124 may be hosted in a physically disparate infrastructure from some or all of the multiple IDPs 114, though such is not required. The systems 116 may be of the same or different organization. The systems 116 may be used for any type or kind of organization, or individual, to host or provide any type or kind of data, service, combinations thereof, or the like.

FIG. 9 illustrates exemplary work flows involved in the transport of challenge-response messages between the primary authentication service 114A and the user's 112 endpoint application (device). In exemplary embodiments, the V-IDP 124 has full awareness of all the challenge mechanisms and the sequence of messages involved between the user 112 and the primary IDP 114. The context is stored previously by the IDP 114 and retrieved when a user 112 first requests access. Several non-limiting examples are provided herein.

Password: A password challenge is first intercepted by the V-IDP 124. The challenge is re-encrypted, such as with the V-IDP's 124 private key(s) and sent to the user 112. When the user 112 responds with password (or its hash thereof), the V-IDP 124 may again intercept the response and re-encrypt the communication before sending to the primary IDP server 114A.

Biometric Factor: The challenge message requesting biometric may be forwarded first from primary IDP 114A to the identity proxy 124, which may in turn relay the challenge to the user 112 end. When user 112 responds with the biometric measurement response, V-IDP 124 may intercept the encrypted response, re-encrypt it, and forward it to the primary IDP 114A.

Two Factor Authentication, such as sent over a mobile: In this case, the second factor challenge (OTP) may be sent directly from the primary IDP 114A to the user 112 end point. The V-IDP 124 may not see the second factor challenge in exemplary embodiments. The challenge response, however, may be forwarded to the V-IDP 124, since the V-IDP 124 is perceived as the IDP 114 by the user 112 end point. In this case, the V-IDP 124 may have sufficient awareness of the sequence of messages involved in authenticating the user 112 based on the user's 112 identity, context, and/or behavioral history. When the V-IDP 124 receives the OTP response from the user 112 end point, the V-IDP 124 may interpret it as a valid message and forward it to the primary IDP server 114A as in the previous two cases. This flow is illustrated by the "2nd factor authentication" messages shown in FIG. 9.

Exemplary sequences of messages involved in the event of the failure of the primary IDP 114A are shown in FIG. 10. A heartbeat may be sent from all the IDPs 114 to the V-IDP 124, such as at regular time intervals. When the heartbeat of the primary IDP 114A fails, this may indicate to the V-IDP 124 that a switch over of the IDP service from the primary IDP 114A to the secondary IDP 114B should be performed. Accordingly, the V-IDP 124 may redirect all new requests for authentication to the secondary IDP 114B. Previously issued SAML tokens may be stored in the users' 112 browsers and client applications 116 in case they are required for persistence, and may be re-presented to the original service 116 which requires federated identity verification in the primary IDP 114A. It may not necessarily be required that the state of the primary IDP 114A (beyond the long-term user credentials) be mirrored in the secondary or other IDPs 114. Other functions like disconnects, token expiries, and the like may be handled as if the primary IDP 114A were operational, in exemplary embodiments.

Resuming service when primary IDP is back and up: When the heartbeat from the primary IDP 114A resumes, the V-IDP 124 may suspend its SAML request redirections to the secondary IDP 114B and may resume its previous relation with primary IDP 114A. The trust between the V-IDP 124 and the applications 116 may be established using PKCs signed with the enterprise's root certification authority, in exemplary embodiments. For example, without limitation, the SAML tokens issued by the IDPs 114 may be re-signed by V-IDP 124 using its PKC; and applications 116 may recognize this PKC and validate the tokens.

As illustrated in FIGS. 1-3, traditionally, organizations rely on a single IDP 14, which may result in business disruption in the event of any outage of the IDP 14. Even where certain market leading IDP solutions 14 are built for robustness, scalability and with redundant infrastructure and rolling upgrades, experience has demonstrated downtimes ranging from a few minutes to a few hours or more. The resilient IAM systems 110 shown and/or described herein proposes an improvement in which a near 100% uptime of IDP services are achievable, even in the event that any one identity service 114 goes down temporarily. Some situations in which the resilient IAM system 110 may provide a significant business benefit are, for example without imitation: insurance annual enrollment program where a service disruption could mean a loss of revenue and customer confidence; an ecommerce company during periods of high demand, such as during Christmas shopping period; the US government, such for the IRS during the annual tax filing season; or any critical service with high intensity—as for example with Covid-19 vaccinations. These are just a few examples provided without limitation. Any number or type of applications of the resilient IAM system 110 for authentication access to any type or kind of data or services may be realized with the resilient IAM system 110.

While certain references may be at time made herein to a primary or secondary designated IDP 114, the systems and methods shown and/or described herein may be used with any number of IDPs 114. Utilization of the IDPs 114 may be performed by the identity proxy 124 in accordance with an established hierarchy such that operations are performed with higher ranking, available ones of the multiple IDPs 114. In other exemplary embodiments, a strict hierarchy may not be required and operations may be directed to any available one of the multiple IDPs 114, such as randomly, by first to respond, last received heartbeat, combinations thereof, or the like.

While certain embodiments herein discuss cloud-based systems, non-cloud-based systems may be used instead of, and/or in conjunction with, such cloud-based systems.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A computerized method for operating an identity access and management ("IAM") system having resiliency features, said computerized method comprising, electronically and automatically:
    interposing a virtualized identity provider ("V-IDP") system between user systems, identity provider ("IDP") systems such that communications between the user systems and the IDP systems are provided by way of the V-IDP system, and computerized systems associated with an organization;
    determining an operationally available one or ones of the IDP systems by:
        monitoring for electronic operational status signals from each of IDP systems; and
        determining that a respective one of the IDP systems is operationally available when one or more of the electronic operational status signals is received from the respective one of the IDP systems;
    receiving, at the V-IDP system from the user systems, requests to access at least one of the computerized systems of the organization ("access requests"), wherein each of the IDP systems are configured for processing the access requests under normal operations, and processing each of said access requests at the V-IDP system by, for each of said access requests, on a request-by-request basis, at least:
        assign a highest ranking one of the operationally available one or ones of the IDP systems to a respective one of the access requests in accordance with an established hierarchy of the IDP Systems, said established hierarchy including a ranking of the IOP systems;
        receiving a challenge from the assigned one of the IDP systems;
        transmitting the challenge to a respective one of the user systems from which the respective one of the access requests originated;
        receiving a challenge response from the respective one of the user systems; and
        transmitting the challenge response to the assigned one of the IDP systems for comparison against stored, acceptable challenge responses.

2. The method of claim 1 wherein:
at least one of the access requests, the challenges, and the challenge responses is encrypted.

3. The method of claim 1 wherein:
the access requests, the challenges, and the challenge responses are each encrypted.

4. The method of claim 3 wherein:
the access requests are encrypted with a certification and key issued by the organization;
the challenges are encrypted with a public key; and
the challenge responses are encrypted with the certification and key issued by the organization.

5. The method of claim 1 wherein:
the access requests, the issued challenges, and the challenge responses, are routed to the highest ranking one of the operationally available one or ones of the IDP systems.

6. The method of claim 1 wherein:
determining the operationally available one or ones of the IDP systems further comprises determining that a respective one of the IDP systems is operationally unavailable when one or more of the electronic operational status signals is not received from the respective one of the IDP systems.

7. The method of claim 1 wherein:
the established hierarchy includes a primary designated one of the IDP systems and a secondary designated one of the IDP systems; and
the access requests, the challenges, and the challenge responses, are routed to the primary designated one of the IDP systems whenever the primary designated one of the IDP systems is indicated as operationally available.

8. The method of claim 7 wherein:
the primary designated one of the IDP systems is local to the organization; and
the secondary designated one of the IDP systems is a cloud-based system remote from the organization.

9. The method of claim 7 wherein:
a directory of the IDP systems is local to the organization; and
each of the IDP systems is a cloud-based system remote from the organization.

10. The method of claim 7 wherein:
the established hierarchy comprise a tertiary designated one of the IDP systems; and
the access requests, the challenges, and the challenge responses, are routed to the tertiary designated one of the IDP systems whenever the primary designated one of the IDP systems and the secondary designed one of the IDP systems is indicated as operationally available.

11. The method of claim 1 wherein:
at least some of the user systems are remote from the organization.

12. The method of claim 1 wherein:
the challenges comprise a password challenge and a second factor challenge.

13. An identity access and management ("IAM") system having resiliency features, said system comprising:
user computer systems;
servers hosting identity provider ("IDP") systems;
computerized systems associated with an organization;
a virtualized identity provider ("V-IDP") system electronically interposed between the user computer systems, the IDP systems, and the computerized systems associated with an organization such that communications between the user computer systems and the IDP systems are provided by way of the V-IDP system, wherein the V-IDP comprises software instructions stored at one or more non-transitory electronic storage devices, which when executed, configure one or more processors to:
monitor for electronic operational status signals from each of the IDP systems;
determine which of the IDP systems are operationally available based on receipt, and lack of receipt, of the electronic operational status signals from each of IDP systems;
receive requests to access at least one of the computerized systems of the organization ("access requests");
disposition each of the access requests by, for each of said access requests, on a request-by-request basis:
assign a highest-ranking, operationally available one of the IDP systems to the access request in accordance with an established hierarchy of the IDP systems, said established hierarchy including a ranking of the IDP systems;
transmitting the access request to the assigned one of the IDP systems;
receiving a challenge issued from the assigned one of the IDP systems;
transmitting the challenge to the respective one of the user systems associated with the access request;
receiving a response to the challenge from the respective one of the user systems; and
transmitting the response to the assigned one of the IDP systems;
wherein each of the IDP systems is configured to, when operating normally, process the access requests.

14. The system of claim 13 wherein:
the access requests, the challenges, and the responses are each encrypted.

15. The system of claim 14 wherein:
the access requests are encrypted with a certification and key issued by the organization;
the challenges are encrypted with a public key; and
the responses are encrypted with the certification and key issued by the organization.

16. The system of claim 13 wherein:
the V-IDP system is configured to route the access requests, the challenges, and the responses, to the highest ranking one of the operationally available one or ones of the IDP systems.

17. The system of claim 13 wherein:
the V-IDP system is configured to determine that a respective one of the IDP systems is operationally unavailable when the electronic operational status signals are not received from the respective one of the IDP systems.

18. The system of claim 13 wherein:
said established hierarchy indicates a primary designated one of the IDP systems and a secondary designated one of the IDP systems; and
the V-IDP system is configured to route the access requests, the challenges, and the responses to the primary designated one of the IDP systems whenever the primary designated one of the IDP systems is indicated as operationally available.

19. An identity access and management ("IAM") system having resiliency features, said IAM system comprising:
computerized systems associated with an origination and configured to receive access requests to portions of stored data; and
identity provider ("IDP") systems, each comprising one or more non-transitory electronic storage devices comprising information regarding users authorized to access the data, or portions thereof, and software instructions, which when executed, configured one or more processors of said IDP systems to:
receive the access requests from user systems attempting to access the data, or portions thereof;
issue challenges to the user systems from which said access requests are received;
receive responses from the user systems to which challenges are issued;
compare said responses to the information to determine whether a match exists;
following determination of a match, issue access approval data to the authenticated user systems; and
periodically transmit an electronic operational status signal indicating operability;
wherein each of the IDP systems is configured to, when operating normally, process the access requests;
an identity proxy electronically interposed between user systems and each of the IDP systems such that communications between the user systems and the IDP systems are provided by way of the identity proxy, wherein said identity proxy comprises one or more non-transitory electronic storage devices comprising software instructions, which when executed configure one or more processors of said identify proxy to:
monitor for the electronic operational status signals from each of the IDP systems to determine operating availability of each of the IDP providers; and
route the access requests, challenges, and responses to a highest ranking one of the IDP providers also indicated as operationally available upon receipt of a respective one of the access requests from a respective one of the user systems in accordance with an established hierarchy of the IDP systems, said established hierarchy including a ranking of the IDP systems.

20. The IAM system of claim 19 wherein:
said established hierarchy indicates a primary designated one of the IDP systems and a secondary designated one of the IDP systems; and
the V-IDP system is configured to route the access requests, the challenges, and the responses to the primary designated one of the IDP systems whenever the primary designated one of the IDP systems is indicated as operationally available.

* * * * *